United States Patent
Luo et al.

(10) Patent No.: US 12,210,448 B2
(45) Date of Patent: Jan. 28, 2025

(54) VIRTUAL INDEXING IN A MEMORY DEVICE

(71) Applicant: Micron Technology, Inc., Boise, ID (US)

(72) Inventors: Xiangang Luo, Fremont, CA (US); Jianmin Huang, San Carlos, CA (US); Xiaolai Zhu, Shanghai (CN); Deping He, Boise, ID (US); Kulachet Tanpairoj, San Mateo, CA (US); Hong Lu, Boise, ID (US); Chun Sum Yeung, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/037,631

(22) PCT Filed: Sep. 1, 2022

(86) PCT No.: PCT/CN2022/116420
§ 371 (c)(1),
(2) Date: May 18, 2023

(87) PCT Pub. No.: WO2024/045104
PCT Pub. Date: Mar. 7, 2024

(65) Prior Publication Data
US 2024/0345947 A1    Oct. 17, 2024

(51) Int. Cl.
*G06F 12/02* (2006.01)
(52) U.S. Cl.
CPC .. *G06F 12/0246* (2013.01); *G06F 2212/7201* (2013.01); *G06F 2212/7205* (2013.01)

(58) Field of Classification Search
CPC ........ G06F 12/0246; G06F 2212/7201; G06F 2212/7205
See application file for complete search history.

(56) References Cited

U.S. PATENT DOCUMENTS

| | | |
|---|---|---|
| 2014/0231954 A1 | 8/2014 | Lue |
| 2016/0179386 A1 | 6/2016 | Zhang |
| 2021/0011845 A1* | 1/2021 | Huang ................ G06F 12/0246 |
| 2023/0409470 A1* | 12/2023 | Muthiah ............. G06F 13/1668 |

FOREIGN PATENT DOCUMENTS

WO    2017074570 A1    5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Eric Cardwell
(74) *Attorney, Agent, or Firm* — Brooks, Cameron & Huebsch, PLLC

(57) ABSTRACT

A method includes writing, to a first data structure, indices corresponding to address locations of a logical-to-physical (L2P) data structure that maps a plurality of logical block addresses (LBAs) associated with the L2P data structure, initiating performance of a media management operation involving one or more memory blocks in which data associated with the LBAs is written, and refraining from rewriting particular entries in the L2P table that correspond to LBAs whose index in the first data structure is a particular value during performance of the media management operation.

20 Claims, 4 Drawing Sheets

VIRTUAL INDEXING IN A MEMORY DEVICE

PRIORITY INFORMATION

This Application is a National Stage Application under 35 U.S.C § of International Application Number PCT/CN2022/116420, filed on Sep. 1, 2022, the contents of which are incorporated herein by reference.

TECHNICAL FIELD

Embodiments of the disclosure relate generally to memory sub-systems, and more specifically, relate to virtual indexing in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
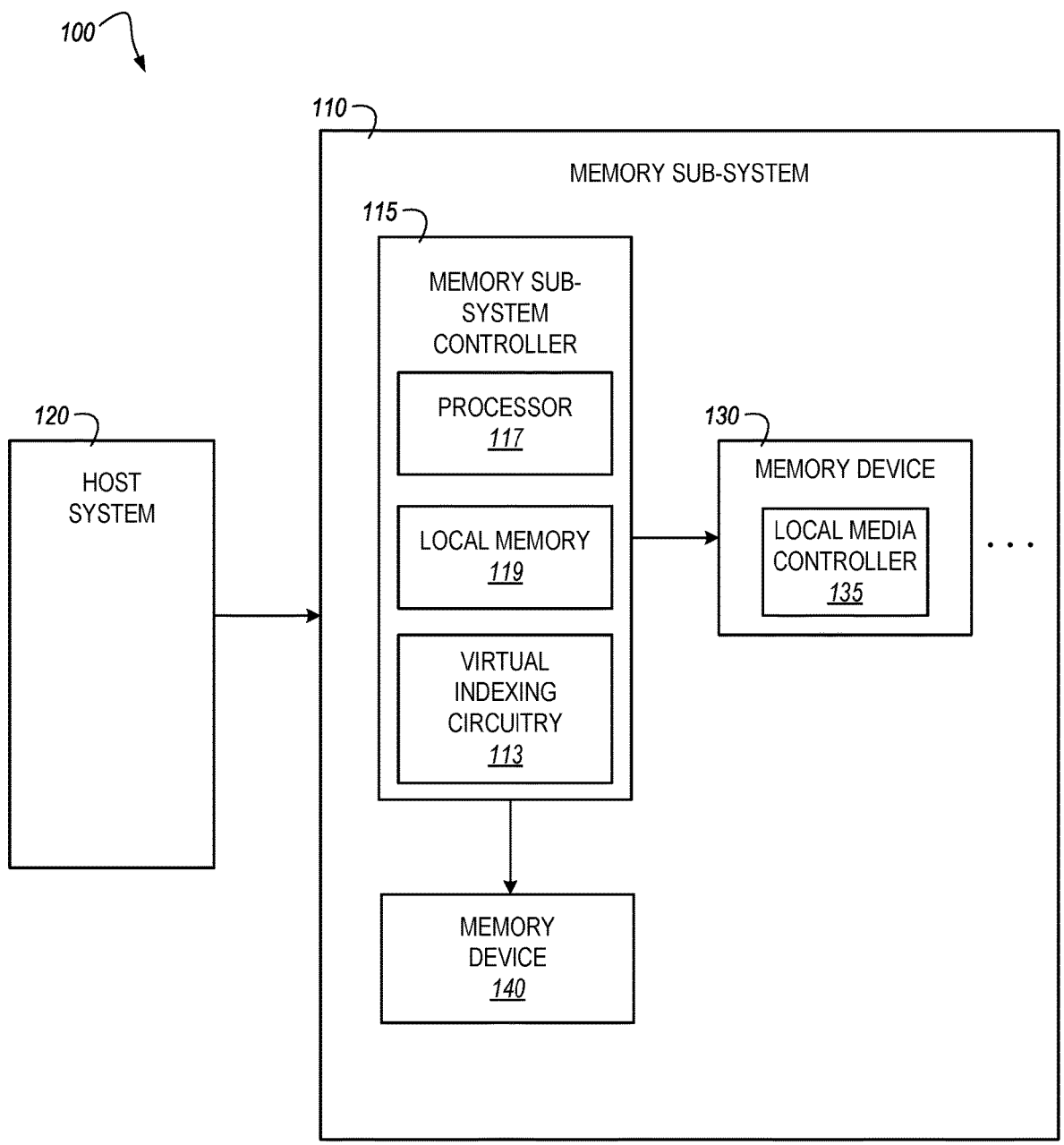
FIG. 1 illustrates an example computing system that includes a memory sub-system in accordance with some embodiments of the present disclosure.

Aspects of the present disclosure are directed to virtual indexing in a memory device and, in particular to memory sub-systems that include virtual indexing circuitry. The virtual indexing circuitry can control organization of data entries in a data structure that can be stored within one or more memory resources that are associated with the memory sub-system and the consolidation of multiple such data structures into one or more indices (e.g., virtual indices). A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MHLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation, data is written to, and retrieved from the memory sub-system. Some data are written to persistent memory devices within the memory sub-system for long-term storage, while other data are written to non-persistent memory devices within the memory subsystem for quick, short-term retrieval. Still other data are written to various memory resources (or portions of memory resources) and/or caches of the memory sub-system to assist with performance of operations involving the memory sub-system. For example, various memory resources and/or caches can be utilized during operation of the memory sub-system to provide read caching, write-through caching, write-back caching, and/or write-around caching. In addition, some memory resources and/or caches of the memory sub-system can be allocated to store various tables that are utilized during operation of the memory sub-system. One such example is a logical-to-physical (L2P) table that is used to map logical addresses utilized by a host system to physical addresses of the memory sub-system where data is physically stored. Another such example is a physical valid table (PVT) that is used to record that each logic block address (LBA) written to a physical block (e.g., physical virtual block (VB)) or to a super block (e.g., multiple LUNs) is valid or invalid. An invalid LBA may be unmapped, written to another physical position by a new host write command, or written for the first time by a host write command.

When a garbage collection operation is triggered the garbage collection operation copies all valid LBAs from a source VB to a destination VB. A SSD with DRAM uses physical to LBA (P2L) table and gets the LBA of each physical position of the source VBs. If the physical position of the source VBs is the same with respect to the physical address of the LBA in the L2P table then the LBA is valid.

In contrast, if the physical position of the source VBs with respect to the L2P table, the LBA may be considered to be invalid.

However, some mobile device technology features architectures that may not include DRAM (or may include a limited amount of DRAM) to read the L2P table from table blocks due to space constraints associated with mobile device (e.g., smartphone, tablet, phablet, etc.) form factors. In general, when a garbage collection operation is triggered the operation requests that all LBAs from the PVT (e.g., valid and invalid) are read; however, generally the valid LBAs are copied from the source VB to a destination VB. If the LBA is invalid, the read of the L2P table is unnecessary and consumes time and resources available to the memory sub-system. Additionally, some approaches require that closed VBs associated with the PVT are updated as part of performance of a garbage collection operation. For example, after the host writes an LBA to the NAND the PVT of the VB is marked and the L2P table is updated. If the precondition is sequential write, several VB PVT updates result from random write and if the precondition is random write, several VB PVT updates result from both sequential and random write causing overhead in the memory sub-system that may be mitigated utilizing the techniques of the present disclosure.

Aspects of the present disclosure address the above and other deficiencies by recording whether each LBA is valid or invalid in a dedicated index of the memory sub-system. For example, in some embodiments, a L2P table index of a written LBA can be recorded in a physical to index (P2I) table. Once the P2I is full the P2I is dumped to NAND, for example during performance of a media management operation such as a garbage collection operation. Prior to the P2I being full, the L2P table index does not need to be recorded again into the P2I table if the L2P table index has been recorded in the P2I table. For example, embodiments described herein provide that the L2P table index of a LBA written by the host is not recorded into the P2I table again if the LBA (e.g., an indication corresponding to the LBA corresponding to valid data) had previously been recorded in the same P2I table.

When a garbage collection operation is triggered, the L2P table recorded in the P2I table of the source VB can be read one by one. All data in one L2P table can be copied from the source VB to the destination VB. For example, data which physical address belongs to the source VB (e.g., all LBAs that belong to the VB) can be copied to the destination VB and the L2P can be updated at the same time. As such, the possibility that all data in the L2P table in the source VB is invalid or becomes invalid is significantly reduced over previous approaches and methods. Therefore, the present disclosure allows for time and resources spent on reading invalid locations to be reduced and/or minimized. In addition, because the possibility that at least some of the locations are valid, aspects of the present disclosure acknowledge that the use of time and resources is better allocated reducing a quantity of invalid data that is read and therefore seek to improve resource allocation in performance of media management operation over previous methods.

For example, in some embodiments, a closed VB's P2I is not modified reducing overhead for later host writes. Additionally, the L2P table update frequency can be reduced thereby improving performance of the memory sub-system in which aspects of the present disclosure operate. As described in more detail herein, if the source VB is written by sequential writes, the P2I table may have several L2P table indices. If the source VB is written by random write, there can be several LBAs belonging to one L2P table, significantly reducing the number of recorded L2P table indices in comparison to previous approaches.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DINM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include virtual indexing circuitry 113. Although not shown in FIG. 1 so as to not obfuscate the drawings, the virtual indexing circuitry 113 can include various circuitry to facilitate recording, in a P2I table, an L2P table index of a written LBA, determining whether the L2P table index of a particular LBA has been previously recorded in the P2I table and, in response to the L2P table index of the particular LBA being previously recorded in the P2I table, refraining from recording the L2P table index of the particular LBA a second time, dumping the P2I table to a NAND when the P2I table is full, and determining whether data written to memory blocks associated with the particular LBA contains valid and/or invalid data. In some embodiments, the virtual indexing circuitry 113 can include special purpose circuitry in the form of an ASIC, FPGA, state machine, and/or other logic circuitry that can allow the virtual indexing circuitry 113 to orchestrate and/or perform operations to selectively perform virtual indexing operations for the memory device 130 and/or the memory device 140 based on determined valid and invalid data written to memory blocks associated with the LBA.

In some embodiments, the memory sub-system controller 115 includes at least a portion of the virtual indexing circuitry 113. For example, the memory sub-system controller 115 can include a processor 117 (processing device) configured to execute instructions stored in local memory 119 for performing the operations described herein. In some embodiments, the virtual indexing circuitry 113 is part of the host system 110, an application, or an operating system.

In a non-limiting example, an apparatus (e.g., the computing system 100) can include virtual indexing circuitry 113. The virtual indexing circuitry 113 can be resident on the memory sub-system 110. As used herein, the term "resident on" refers to something that is physically located on a particular component. For example, the virtual indexing circuitry 113 being "resident on" the memory sub-system 110 refers to a condition in which the hardware circuitry that comprises the virtual indexing circuitry 113 is physically located on the memory sub-system 110. The term "resident on" can be used interchangeably with other terms such as "deployed on" or "located on," herein.

The virtual indexing circuitry 113 can be configured to maintain a table corresponding to L2P mappings of LBAs or a range of LBAs that correspond to data entries written to a plurality of memory blocks. In some embodiments, at least a subset of the plurality of memory blocks comprise virtual memory blocks. As described above, the memory components can be memory dice or memory packages that form at least a portion of the memory device 130 and/or the memory device 140.

The virtual indexing circuitry 113 can be further configured to maintain a table corresponding to indices that correspond to logical addresses within the table that correspond to the L2P of the LBAs or a range of LBAs. In some embodiments, the indices corresponding to the logical addresses within the table corresponding to the L2P LBAs or the range of LBAs comprise Boolean logical values (e.g., a logical "1" or a logical "0"), although embodiments are not so limited. The table corresponding to the indices (e.g., a P2I table) can include indices that are determined based on a determined ratio of valid data and invalid data entries written to the plurality of memory blocks. As described above, data entries may be marked as invalid when the data entries comprise entries that have been unmapped or have been written to a different memory block than a memory block in which the data entries were previously written. Additionally, the physical address in the L2P table can me marked invalid when the LBA is written for the first time. As such, the invalid data entries can generally comprise data written to at least one memory block among the plurality of memory blocks that does not have a corresponding LBA associated therewith.

In some embodiments, the virtual indexing circuitry 113 can be further configured to control performance of a media management operation involving one or more of the plurality of memory blocks. In particular, the virtual indexing circuitry 113 can be configured to refrain from rewriting particular entries in the L2P table that correspond to the LBAs or the range of LBAs whose indices (e.g., the indices corresponding to the ratio of valid data and invalid data entries written to the plurality of memory blocks) meet a particular criterion. The particular criterion can be a threshold ratio of valid data entries to invalid data entries written to at least one memory block among the plurality of memory blocks.

The virtual indexing circuitry 113 can be configured to perform a garbage collection operation, folding operation, etc. as part of performance of the media management operation. When the garbage collection operation is triggered the L2P table recorded in the P2I table of the source VB can be read one by one and all data which physical address belongs to the source VB can be copied. At the same time, the virtual indexing circuitry 113 can update the L2P.

Figure 2:
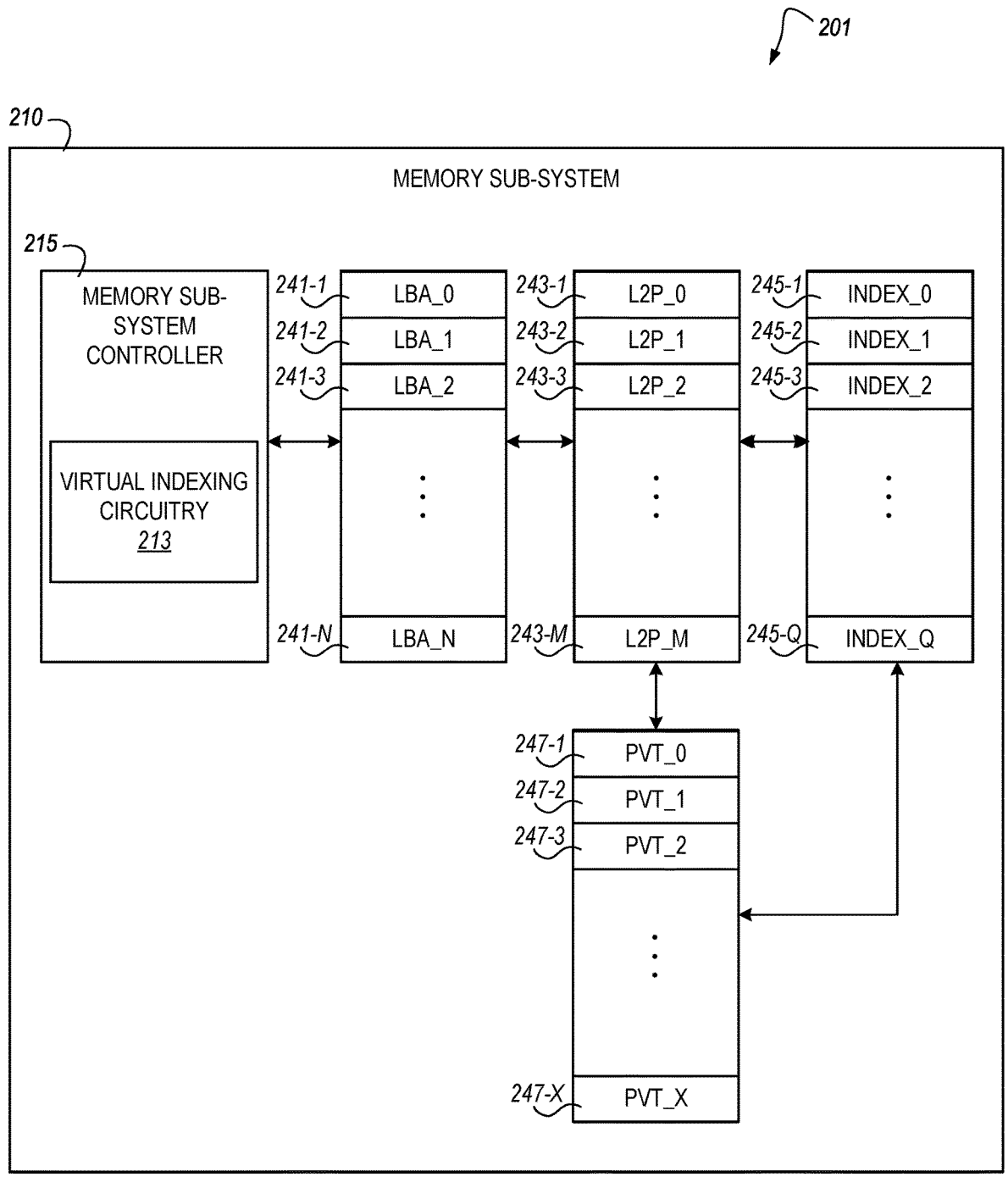
FIG. 2 is a functional block diagram corresponding to virtual indexing in a memory device in accordance with some embodiments of the present disclosure.

FIG. 2 is a functional block diagram 201 corresponding to memory sub-system virtual indexing in accordance with some embodiments of the present disclosure. The system, which can be referred to in the alternative as an "apparatus," includes a memory sub-system 210, a memory sub-system controller 215 and virtual indexing circuitry 213 or "control circuitry," which can be analogous to the memory sub-system 110, the memory sub-system controller 115, and the virtual indexing circuitry 113 illustrate in FIG. 1, herein. The memory sub-system 210 includes an LBA table that includes a plurality of address locations 241-1, 241-2, 241-3 to 241-N (collectively referred to hereinafter as "address locations 241"), an L2P table that includes a plurality of address locations 243-1, 243-2, 243-3 to 243-M (collectively referred to hereinafter as "address locations 243"), an INDEX or P2I table that includes a plurality of address locations 245-1, 245-2, 245-3 to 245-Q (collectively referred to hereinafter as "address locations 245"), and a PVT table that includes a plurality of address locations 247-1, 247-2, 247-3 to 247-X (collectively referred to hereinafter as "address locations 247").

The address location 243 can be configured to store data entries in a data structure. As used herein, a "data structure" refers to a specialized format for organizing and/or storing data, which may or may not be organized in rows and columns. Examples of data structures include arrays, files, records, tables, trees, linked lists, hash tables, etc. In some embodiments, the data structure can be configured to store a logical block address (LBA) mapping table, a logical-to-physical (L2P) mapping table, a physical-to-index (P2I) mapping table, and/or a physical valid table (PVT), although embodiments are not limited to these particular examples. In general, the P2I table is configured to store indices corresponding to physical indices of the L2P table.

The LBA_0 241-1 can be referred to as a "first logical address," a "zeroth address location," or a "lowermost logical location" of the LBA table, herein. The LBA_N 241-N can be referred to as a "last logical address," an "Nth address location," or an "uppermost logical location" of the LBA table, herein. The L2P_0 243-1 can be referred to as a "first physical address," a "zeroth address location," or a "lowermost physical location" of the L2P table, herein. The L2P_M 243-M can be referred to as a "last physical address," an "$M_{th}$ address location," or an "uppermost physical location" of the L2P table, herein. The INDEX_0 245-1 can be referred to as a "first physical address," a "zeroth address location," or a "lowermost physical location" of the INDEX or P2I table, herein. The INDEX_Q 245-Q can be referred to as a "last physical address," an "$Q_{th}$ address location," or an "uppermost physical location" of the INDEX or P2I table, herein. The PVT_0 247-1 can be referred to as a "first physical address," a "zeroth address location," or a "lowermost physical location" of the PVT, herein. The PVT_X 247-X can be referred to as a "last physical address," an "$X_{th}$ address location," or an "uppermost physical location" of the PVT, herein.

As shown in FIG. 2, the LBA table, the L2P table, the INDEX or P2I table, and the PVT are resident on the memory sub-system 210. In the example of FIG. 2, the LBA table, the L2P table, the INDEX or P2I table, and the PVT can be resident on the memory sub-system 210 and not resident on any other component of the memory sub-system. Further, in some embodiments, the PVT table can be optional or can be removed from the memory sub-system 210. Embodiments are not so limited and although not explicitly illustrated so as to not obfuscate the drawing layout, the LBA table, the L2P table, the INDEX or P2I table, and/or the PVT can be resident (or partially-resident) on any component of the memory subsystem 210. For example, the memory sub-system 210 can be resident on the memory sub-system controller 215, the virtual indexing circuitry 213, the memory device 130, the local media controller 135, and/or the memory device 140 illustrated in FIG. 1.

As an illustrative example of the disclosure, an index corresponding to data associated with the L2P table (e.g., the table containing entries 243) can be written to the P2I table. The L2P index can correspond to an address written to the L2P table that is associated with a LBA (e.g., as recorded in the table containing the entries 241), as mentioned above. The index written to the P2I table can comprise a single bit (e.g., a Boolean logical bit such as a logical "1" or "0"), although embodiments are not so limited. This indication can correspond to, at minimum, a ratio of valid data to invalid data associated with LBAs that are associated to the L2P table.

The indices of the P2I table (e.g., the table containing the entries 245) can be read to determine the validity of data entries associated with the L2P table and, consequently, the LBAs to determine whether an index in the L2P table should be updated in response to an alteration in the LBAs. That is, if an entry in the P2I table corresponds to an LBA (e.g., an altered, rewritten, etc. LBA), embodiments herein provide that the L2P index does not need to be rewritten if the P2I table includes a corresponding entry involving such LBAs.

For example, consider an LBA written to the LBA table at 241-1 (e.g., LBA_0). In a simplified example, a logical-to-physical address corresponding to the LBA 241-1 can be written to the L2P table at 243-1 (e.g., L2P_0). An index value (e.g., a logical "1") can be written at INDEX_0 245-1 in the P2I table in response to a determination that a VB associated with the LBA, the L2P entry, etc. is closed (e.g., indicating that the L2P entry is generally valid with respect to the index written to the P2I table at 245-1). This can mitigate the likelihood that all of the data associated with a VB that is associated to the L2P table can become invalid prior to performance of a media management operation. For example, by determining that a VB is closed in response to the P2I table including an index indicating that the VB is closed, it can be assumed that the LBAs and/or L2P table are unlikely to be updated further, and are therefore probabilistically more likely to remain valid, prior to performance of a media management operation.

In some embodiments, the media management operation can be performed utilizing the closed VBs based on the indices written to the P2I table in an effort to mitigate a frequency of updates incurred by the L2P table in previous approaches. For example, by recording the indices discussed herein in the P2I table, it can become possible to perform media management operations, such as garbage collection operations, folding operations, etc. without further updating the L2P table at least because the P2I table stores indications that VBs associated to the L2P table have been closed and are therefore unlikely to become invalid prior to performance of such media management operations, as discussed above.

In a non-limiting example, an apparatus (e.g., the memory sub-system 210) includes the LBA table, the L2P table, the INDEX or P2I table, the PVT and a processing device (e.g., the virtual indexing circuitry 213). The apparatus can be a system-on-chip, although embodiments are not so limited. The processing device can write a data entry to an address location 241 of the LBA table. The data entry can be a new data entry or the data entry can be a data entry that was previously written to a different LBA location. The processing device can map a plurality of LBAs that are associated with a L2P data structure to the L2P table 243. Further the processing device can map a plurality of L2P data that are associated with an INDEX or L2I data structure to the INDEX or L2I table 245. The PVT 247 can comprise data, corresponding with the L2P data, marked as invalid (e.g., unmapped data, new data entries, data entries located in a different LBA than a previous entry of the same data) or valid, and as such, corresponding indices can comprise valid data entries and invalid data entries. In some embodiments, the processing device can write, to a first data structure, indices corresponding to address locations of the L2P data structure.

During a media management operation such as a garbage collection operation, the processing device can be configured to read the L2P table 243 recorded in the INDEX or P2I table 245 of a source VB one by one. All data in the L2P table 243 (e.g., including valid data entries and invalid data entries) can be copied to a destination VB.

Figure 3:
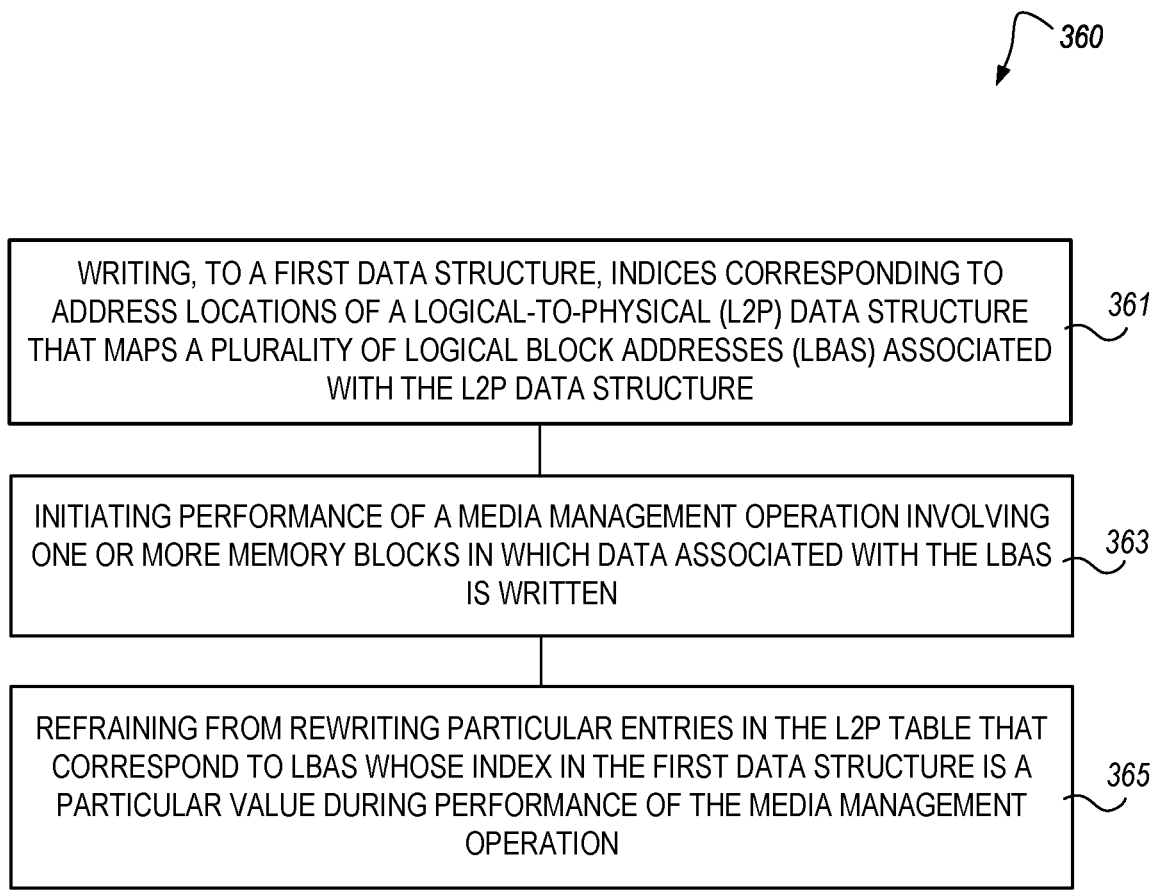
FIG. 3 is a flow diagram corresponding to a method for virtual indexing in a memory device in accordance with some embodiments of the present disclosure.

FIG. 3 is flow diagram corresponding to a method 340 for virtual indexing in a memory device in accordance with some embodiments of the present disclosure. The method 360 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 360 is performed by the virtual indexing circuitry 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 361, indices corresponding to address locations of a logical-to-physical (L2P) data structure that maps a plurality of logical block addresses (LBAs) associated with the L2P data structure can be written to a first data structure. In some embodiments, the indices corresponding to the address locations can comprise Boolean logical values. A first index, corresponding to a first range of LBAs, can be written to the first data structure. Additionally, a second index, corresponding to a second range of LBAs, can be written to the first data structure. Embodiments are not so limited, however, and in some embodiments a plurality of indices corresponding to a plurality of ranges of LBAs can be written to the first data structure. In some embodiments, the indices corresponding to address locations of the L2P data structure that maps the plurality of LBAs can be written to the first data structure based on a determined ratio of valid and invalid data written to one or more memory blocks associated with the LBAs.

At operation 363, performance of a media management operation involving one or more memory blocks in which data associated with the LBA is written can be initiated. At least one memory block in which the data associated with the LBAs are stored can be a virtual memory block. Valid and invalid data can be written to at least one of the memory blocks or virtual memory blocks associated with the LBAs. In some embodiments, the media management operation can copy valid LBAs from a media management operation source VB to a destination VB. In some embodiments, the media management operation can be a garbage collection operation.

At operation 365, particular entries in the L2P table that correspond to LBAs whose index in the first data structure is a particular value can be refrained from being rewritten during performance of the media management operation. In some embodiments, particular entries can be refrained from being rewritten in the L2P table that correspond to LBAs whose indices correspond to a determined ratio of valid data entries to invalid data entries written to one or more memory blocks associated with the LBAs.

In some embodiments, the method 360 can include virtual indexing address locations of the L2P data structure for a memory sub-system in response to a determined ratio of valid data and invalid data written to one or more memory blocks associated with an LBA associated with the L2P data structure. In some embodiments, the memory sub-system can be analogous to the memory sub-system 110 illustrated in FIG. 1.

Figure 4:
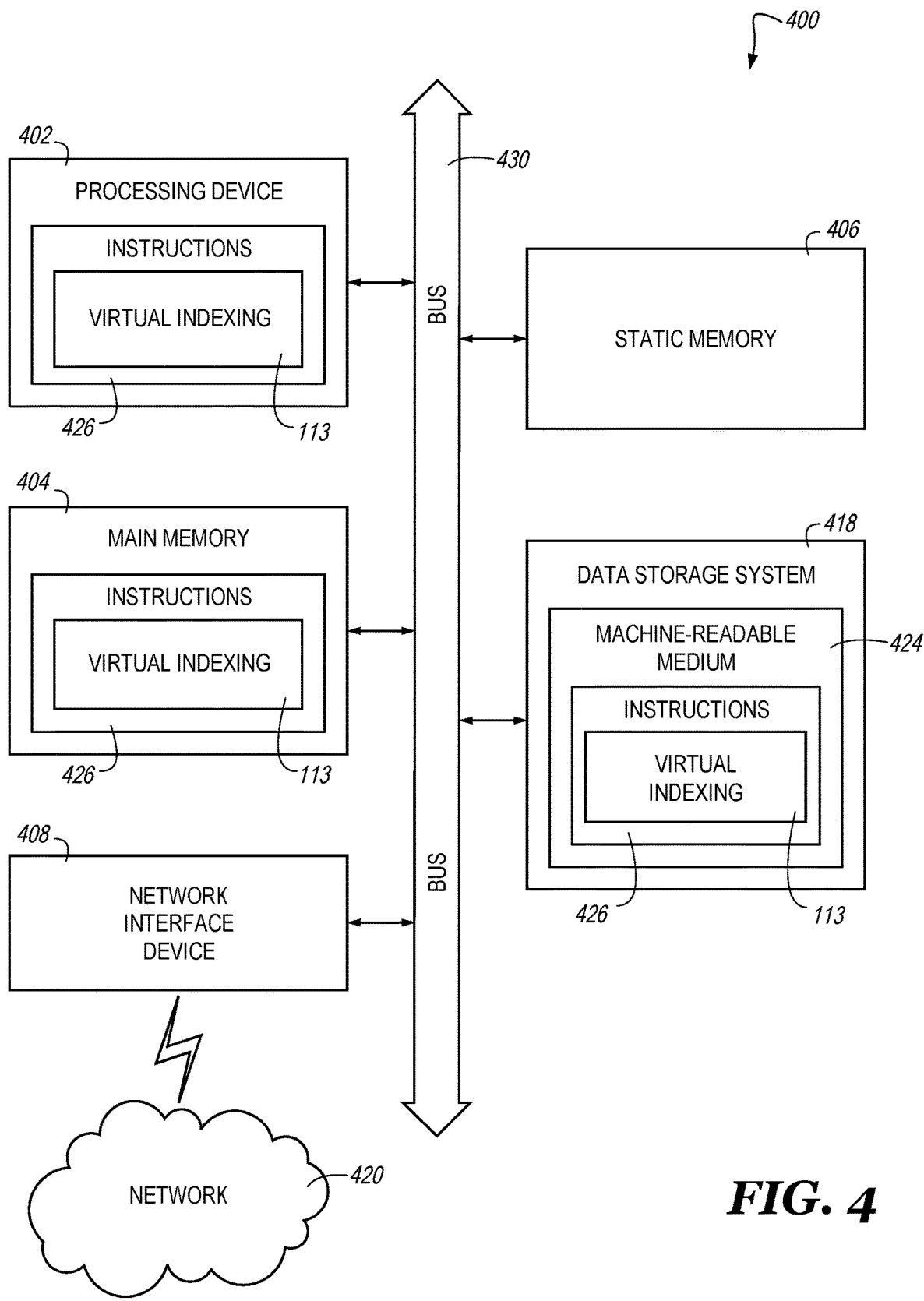
FIG. 4 is a block diagram of an example computer system in which embodiments of the present disclosure may operate.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the virtual indexing circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a virtual indexing circuitry (e.g., the virtual indexing circuitry 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   writing, to a first data structure, indices corresponding to address locations of a logical-to-physical (L2P) data structure that maps a plurality of logical block addresses (LBAs) associated with the L2P data structure;
   initiating performance of a media management operation involving one or more memory blocks in which data associated with the LBAs is written;
   refraining from rewriting particular entries in the L2P table that correspond to LBAs whose index in the first data structure is a particular value during performance of the media management operation.

2. The method of claim 1, wherein the indices comprise Boolean logical values.

3. The method of claim 1, further comprising writing a first index corresponding to a first range of LBAs of the first data structure and writing a second index corresponding to a second range of LBAs to the first data structure.

4. The method of claim 1, wherein the one or more of the memory blocks in which the data associated with the LBAs are stored comprise virtual memory blocks.

5. The method of claim 1, wherein the media management operation is a garbage collection operation.

6. The method of claim 1, further comprising writing the indices corresponding to address locations of the L2P data structure that maps the plurality of LBAs based on a determined ratio of valid data and invalid data that is written to the one or more memory blocks associated with the LBAs.

7. An apparatus, comprising:
   a memory device that comprises a plurality of memory blocks; and
   a processing device coupled to the memory device, wherein the processing device is configured to:
      maintain a table corresponding to logical-to-physical (L2P) mappings of logical block addresses (LBAs) that correspond to data entries written to the plurality of memory blocks;
      maintain a table corresponding to indices that correspond to logical addresses within the table corresponding to the L2P of the LBAs, wherein the table corresponding to the indices include indices that are determined based on a determined ratio of valid data and invalid data entries written to the plurality of memory blocks; and
      control performance of a media management operation involving one or more of the plurality of memory blocks while refraining from rewriting particular entries in the L2P table that correspond to LBAs whose indices correspond to the determined ratio of valid data and invalid data entries written to the plurality of memory blocks meeting a particular criterion.

8. The apparatus of claim 7, further comprising a mobile computing device, wherein the memory device and the processing device are resident on the mobile computing device.

9. The apparatus of claim 7, wherein at least a subset of the plurality of memory blocks comprise virtual memory blocks.

10. The apparatus of claim 7, wherein the indices comprise Boolean logical values.

11. The apparatus of claim 7, wherein the media management operation comprises a garbage collection.

12. The apparatus of claim 7, wherein the particular criterion corresponds to a threshold ratio of valid data to invalid data written to at least one memory block among the plurality of memory blocks.

13. A system, comprising:
- a memory device comprising a plurality of blocks of memory; and
- a processing device coupled to the memory device, wherein the processing device is configured to:
  - maintain a table corresponding to logical-to-physical (L2P) mappings of a range of logical block addresses (LBAs) that correspond to data entries written to the plurality of blocks of memory;
  - maintain a table corresponding to indices that correspond to logical addresses within the table corresponding to the L2P of the range of LBAs, wherein the table corresponding to the indices include indices that are determined based on a determined valid data and invalid data entry ratio written to the plurality of blocks of memory; and
  - control performance of a media management operation involving one or more of the plurality of blocks of memory while refraining from rewriting particular entries in the L2P table that corresponds to the range of LBAs whose indices correspond to the determined valid data and invalid data entry ratio written to the plurality of blocks of memory meeting a particular criterion.

14. The system of claim 13, wherein the processing device is configured to perform a garbage collection operation as part of performance of the media management operation.

15. The system of claim 13, wherein the particular criterion is a threshold ratio of valid data entries to invalid data entries written to the plurality of blocks of memory.

16. The system of claim 15, wherein the invalid data entries comprise data entries that have been unmapped or written to a different block of memory than a block of memory in which the data entries were previously written.

17. The system of claim 15, wherein the invalid data entries comprise new data written to at least one memory block among the plurality of memory blocks that does not have a corresponding LBA associated therewith.

18. The system of claim 13, wherein the memory device is a NAND memory device resident on a mobile computing device.

19. The system of claim 13, wherein at least a subset of the plurality of blocks of memory comprise virtual blocks of memory.

20. The system of claim 13, wherein the indices corresponding to the logical addresses within the table corresponding to the L2P of the range of LBAs comprise Boolean logical values.

* * * * *